United States Patent
Hwang

(10) Patent No.: US 12,544,416 B2
(45) Date of Patent: Feb. 10, 2026

(54) MANUFACTURING METHOD FOR COMPOSITION PROMOTING BONE DENSITY ENHANCEMENT

(71) Applicant: Man Ki Hwang, Seoul (KR)

(72) Inventor: Man Ki Hwang, Seoul (KR)

( * ) Notice: Subject to any disclaimer, the term of this patent is extended or adjusted under 35 U.S.C. 154(b) by 300 days.

(21) Appl. No.: 18/545,273

(22) Filed: Dec. 19, 2023

(65) Prior Publication Data
US 2024/0216452 A1 Jul. 4, 2024

(30) Foreign Application Priority Data
Jan. 2, 2023 (KR) ........................ 10-2023-0000098

(51) Int. Cl.
| | | |
|---|---|---|
| *A61K 36/734* | (2006.01) | |
| *A61K 31/473* | (2006.01) | |
| *A61K 36/21* | (2006.01) | |
| *A61K 36/232* | (2006.01) | |
| *A61K 36/234* | (2006.01) | |
| *A61K 36/254* | (2006.01) | |
| *A61K 36/284* | (2006.01) | |
| *A61K 36/324* | (2006.01) | |
| *A61K 36/328* | (2006.01) | |
| *A61K 36/344* | (2006.01) | |
| *A61K 36/40* | (2006.01) | |
| *A61K 36/46* | (2006.01) | |
| *A61K 36/481* | (2006.01) | |
| *A61K 36/484* | (2006.01) | |
| *A61K 36/53* | (2006.01) | |
| *A61K 36/64* | (2006.01) | |
| *A61K 36/65* | (2006.01) | |
| *A61K 36/752* | (2006.01) | |
| *A61K 36/815* | (2006.01) | |
| *A61K 36/8945* | (2006.01) | |
| *A61K 36/8998* | (2006.01) | |
| *A61K 36/9064* | (2006.01) | |

(52) U.S. Cl.
CPC .......... *A61K 36/232* (2013.01); *A61K 31/473* (2013.01); *A61K 36/21* (2013.01); *A61K 36/234* (2013.01); *A61K 36/254* (2013.01); *A61K 36/284* (2013.01); *A61K 36/324* (2013.01); *A61K 36/328* (2013.01); *A61K 36/344* (2013.01); *A61K 36/40* (2013.01); *A61K 36/46* (2013.01); *A61K 36/481* (2013.01); *A61K 36/484* (2013.01); *A61K 36/53* (2013.01); *A61K 36/64* (2013.01); *A61K 36/65* (2013.01); *A61K 36/734* (2013.01); *A61K 36/752* (2013.01); *A61K 36/815* (2013.01); *A61K 36/8945* (2013.01); *A61K 36/8998* (2013.01); *A61K 36/9064* (2013.01); *A61K 2236/15* (2013.01); *A61K 2236/17* (2013.01); *A61K 2236/33* (2013.01); *A61K 2236/39* (2013.01)

(58) Field of Classification Search
CPC .... A61K 36/232; A61K 31/473; A61K 36/21; A61K 36/234; A61K 36/254; A61K 36/284; A61K 36/324; A61K 36/328; A61K 36/344; A61K 36/40; A61K 36/46; A61K 36/481; A61K 36/484; A61K 36/53; A61K 36/64; A61K 36/65; A61K 36/734; A61K 36/752; A61K 36/815; A61K 36/8945; A61K 36/8998; A61K 36/9064; A61K 2236/15; A61K 2236/17; A61K 2236/33; A61K 2236/39; A61P 19/08; A61P 19/41; A61P 19/11; A61P 19/01
See application file for complete search history.

(56) References Cited

FOREIGN PATENT DOCUMENTS

| KR | 10-2015-0099043 A | 8/2015 |
|---|---|---|
| KR | 10-2355277 B1 | 1/2022 |

OTHER PUBLICATIONS

Chen, Qiu-Fa. "A Mulberry Preventing Lassitude, Muscles Weakness Of Parasitic Oral Liquid And Preparation Method Thereof". CN 104432386 A, filed Dec. 23, 2014, and published Mar. 25, 2015—English translation (Year: 2015).*
Written Decision on Registration for KR 10-2023-0000098 dated Oct. 16, 2023.
Notice of Preliminary Review Results for KR 10-2023-0000098 dated Feb. 23, 2023.

* cited by examiner

*Primary Examiner* — Susan Hoffman
*Assistant Examiner* — Nashara L Moreau
(74) *Attorney, Agent, or Firm* — Sughrue Mion, PLLC

(57) ABSTRACT

Disclosed herein is a method for manufacturing a composition promoting bone density enhancement, the method including preparing a mixture of *Angelica gigas, Cnidium officinale, Phlomis umbrosa, Astragalus membranceus, Amomi fructus, Citri unshius pericarpium, Drynariae rhizoma, Codonopsis pilosulae radix*, frankincense, and myrrh, aging the mixture, drying the mixture and grinding the dried mixture into a powder, and extracting a liquid from the powder.

3 Claims, No Drawings

MANUFACTURING METHOD FOR COMPOSITION PROMOTING BONE DENSITY ENHANCEMENT

CROSS-REFERENCE TO RELATED APPLICATION

This application claims priority to and the benefit of Korean Patent Application No. 2023-0000098, filed on Jan. 2, 2023, the disclosure of which is incorporated herein by reference in its entirety.

BACKGROUND

1. Field of the Invention

The present disclosure relates to a method for manufacturing a composition promoting bone density enhancement, and more particularly, to a method for manufacturing a composition that promotes bone density enhancement which can compensate for a deficiency of female sex hormones in the body using a mixture containing *Angelica gigas, Cnidium officinale, Phlomis umbrosa, Astragalus membranceus, Amomi fructus, Citri unshius pericarpium, Drynariae rhizoma, Codonopsis pilosulae radix*, frankincense, and myrrh, and increase bone density by enhancing absorption.

2. Description of the Related Art

Recently, osteoporosis, fractures, back pain, and other bone-related conditions have been on the rise as the population ages.

The incidence of bone disease is increasing due to insufficient intake of calcium, decreased ability to absorb calcium, and hormonal imbalance after menopause.

In order to prevent various bone diseases such as osteoporosis, bone fractures, and low back pain, bone mass in the body can be increased by promoting bone formation by osteoblasts or bone resorption by osteoclasts can be inhibited. In particular, bones are constantly undergoing a balanced cycle of resorption and formation. However, when bone resorption exceeds bone formation due to changes in hormonal balance after menopause, it causes various bone diseases such as osteoporosis, bone fractures, and low back pain.

To strengthen bones against these causes, calcium salts such as calcium carbonate, calcium phosphate, and calcium lactate, and natural calcium preparations such as whey calcium, powdered beef bones, and egg shells are ingested alone in medicines, foods, and feeds, or in combination with substances that promote the absorption of calcium, such as casein phosphopeptides and oligosaccharides, in medicines, foods, and feeds.

However, when these calcium salts or natural calcium preparations are added to food, the absorption rate of calcium is 50% or less. Most of the calcium is not absorbed and is excreted from the body. In addition, even if calcium is absorbed, it may not necessarily improve bone metabolism or strengthen bones because its affinity for bone varies depending on its form and the type of other nutritional components consumed at the same time.

In addition, female sex hormone preparations, active vitamin D3, vitamin K2, bisphosphonates, calcitonin, etc. are known, and new drugs such as anti-RANKL antibodies are under development. However, pharmaceuticals have side effects such as tinnitus, headache, and loss of appetite, and have the limitation that they cannot be added to food.

Meanwhile, in order to prevent various bone diseases such as osteoporosis, bone fractures, and low back pain, there is a need to develop compositions that can be orally consumed for a long period of time and applied to various fields such as food and feed.

PRIOR ART LITERATURE (Patent Document 1) Korean Patent Application Publication No. 10-2015-0099043 (Aug. 31, 2015)

SUMMARY OF THE DISCLOSURE

Therefore, the present disclosure has been made in view of the above problems, and it is an object of the present disclosure to provide a method for manufacturing a composition promoting bone density enhancement that may complement female sex hormones and increase bone density to prevent osteoporosis.

In accordance with the present disclosure, the above and other objects can be accomplished by the provision of a method for manufacturing a composition promoting bone density enhancement, the method including preparing a mixture of *Angelica gigas, Cnidium officinale, Phlomis umbrosa, Astragalus membranceus, Amomi fructus, Citri unshius pericarpium, Drynariae rhizoma, Codonopsis pilosulae radix*, frankincense, and myrrh, aging the mixture, drying the mixture and grinding the dried mixture into a powder, and extracting a liquid from the powder.

According to one embodiment, the composition may contain 5-10 parts by weight of *Angelica gigas*, 5-10 parts by weight of *Cnidium officinale*, 5-7 parts by weight of *Phlomis umbrosa*, 30-45 parts by weight of *Astragalus membranceus*, 5-10 parts by weight of *Amomi fructus*, 5-10 parts by weight of *Citri unshius pericarpium*, 1-5 parts by weight of *Drynariae rhizoma*, 1-5 parts by weight of *Codonopsis pilosulae radix*, 1-5 parts by weight of frankincense, and 1-5 parts by weight of myrrh.

According to one embodiment, the composition further contains 1-5 parts by weight of *Atractylodes* rhizome, 1-5 parts by weight of hawthorn, 1-5 parts by weight of malt, 1-5 parts by weight of *Paeonia japonica*, 5-7 parts by weight of eucommiae cortex, 1-5 parts by weight of corydaline, 5-7 parts by weight of *Achyranthes*, 5-7 parts by weight of *Acanthopanax*, 1-5 parts by weight of quince, 1-5 parts by weight, liquorice 1-5 parts by weight of the Chinese matrimony vine, 1-5 parts by weight of dioscoreae rhizoma, 1-5 parts by weight of *Cornus* fruit, and 1-5 parts by weight of dried *Rehmannia glutinosa*.

According to one embodiment of the present disclosure, the aging of the mixture includes adding 5-10 parts by weight of oat milk and 1-5 parts by weight of flaxseed oil to the mixture and aging the mixture at a temperature of 40° C. for 5 hours.

According to one embodiment, the extracting of the liquid from the powder may include adding 5-10 weight parts of ethanol to the powder as a solvent, and repeatedly performing the extraction 6 times at a temperature of 60° C. for 2 hours by applying 20-30 kHz ultrasonic waves.

DETAILED DESCRIPTION OF THE DISCLOSURE

Hereinafter, specific details for practicing the present disclosure are described in detail. However, in the following description, detailed descriptions of widely known functions or configurations are omitted to avoid obscuring the main points of the present disclosure unnecessarily.

The terms used in this specification will be briefly described, and then embodiments of the present disclosure will be described in detail. Although the terms used in this specification are selected, as much as possible, from general terms that are widely used at present while taking into consideration the functions obtained in accordance with at least one embodiment, these terms may be replaced by other terms based on intentions of those skilled in the art, judicial precedent, emergence of new technologies, or the like. Additionally, in a particular case, terms that are arbitrarily selected by the applicant may be used. In this case, meanings of these terms will be disclosed in detail in the corresponding description of the present disclosure. Accordingly, the terms used herein should be defined based on practical meanings thereof and the whole content of this specification, rather than being simply construed based on names of the terms.

A singular expression includes a plural expression unless the context clearly dictates otherwise. In addition, plural expressions include singular expressions unless the context clearly indicates that they are plural.

Throughout this specification, when a part "includes" a component, it means that the part may further include other components, rather than excluding the other components, unless otherwise stated.

As used throughout this specification, the terms "approximately," "substantially," and the like are intended to be inclusive of tolerances when tolerances exist.

Throughout this specification, the term "combination(s) thereof" as used in a Makushi-style expression means a mixture or combination of one or more selected from a group of components described in the Makushi-style expression.

Throughout this specification, references to "A and/or B" shall mean "A, or B, or A and B".

Hereinafter, embodiments of the present disclosure will be described in detail so that those skilled in the art can easily practice the present disclosure. The present disclosure may, however, be embodied in many different forms and should not be construed as limited to the embodiments set forth herein.

A method for manufacturing a composition promoting bone density enhancement according to one embodiment of the present disclosure includes preparing a mixture of *Angelica gigas*, *Cnidium officinale*, *Phlomis umbrosa*, *Astragalus membranceus*, *Amomi fructus*, *Citri unshius pericarpium*, *Drynariae rhizoma*, *Codonopsis pilosulae radix*, frankincense, and myrrh, aging the mixture, drying and grinding the mixture into a powder, and extracting a liquid from the powder.

According to one embodiment of the present disclosure, the method for manufacturing a composition promoting bone density enhancement includes preparing a mixture by mixing *Angelica gigas*, *Cnidium officinale*, *Phlomis umbrosa*, *Astragalus membranceus*, *Amomi fructus*, *Citri unshius pericarpium*, *Drynariae rhizoma*, *Codonopsis pilosulae radix*, frankincense, and myrrh.

The composition according to the present disclosure contains 5-10 parts by weight of *Angelica gigas*, 5-10 parts by weight of *Cnidium officinale*, 5-7 parts by weight of *Phlomis umbrosa*, 30-45 parts by weight of *Astragalus membranceus*, 5-10 parts by weight of *Amomi fructus*, 5-10 parts by weight of *Citri unshius pericarpium*, 1-5 parts by weight of *Drynariae rhizoma*, 1-5 parts by weight of *Codonopsis pilosulae radix*, 1-5 parts by weight of frankincense, and 1-5 parts by weight of myrrh.

The composition according to the present disclosure contains 10-15 parts by weight of *Angelica gigas*.

The *Angelica gigas* according to the present disclosure is the dried root of *Angelica gigas* Nakai, which belongs to the Umbeliferae, and contains a large amount of coumarin components such as decursin, decursinol, nodakenetin, umbelliferone, nodakenin, xanthotoxin, isopimpinellin, and ostol, which have excellent antioxidant activity and are used for the prevention and treatment of various diseases as they improve blood circulation, and have analgesic effect, hematopoietic effect, anti-inflammatory effect, etc.

In addition, the ability of *Angelica gigas* to proliferate bone cells has already been reported (Journal of Biopharmacology 40(3): 190-195 (2009), Activity of Medicinal Plants on Proliferation and Differentiation of Osteoblasts). *Angelica gigas* directly stimulates bone cell proliferation, alkaline phosphatase (ALP) activity, and protein secretion.

Leaves, shoots or roots of *Angelica gigas* according to the present disclosure may be used. Preferably, the roots are used.

The composition according to the present disclosure contains 5-10 parts by weight of *Cnidium officinale*.

*Cnidium officinale* according to the present disclosure, which is a perennial herb of the dicotyledonous plant, Umbrella family, Apiaceae, contains a large amount of alkaloids (Tetramethylpyrazine, Perolyrine), phenolic components (Chrysophanoll, Sedanonic acid), lactones, and vitamin E. Thus, it exhibits excellent antioxidant activity and is used for the prevention and treatment of various diseases due to its analgesic, tonic, antibacterial, anti-inflammatory, and immune-enhancing effects.

Leaves, stems or roots of *Cnidium officinale* according to the present disclosure may be used. Preferably, the roots are used.

The composition according to the present disclosure contains 5-7 parts by weight of *Phlomis umbrosa*.

*Phlomis umbrosa* according to the present disclosure, which refers to the root of the harebell, a perennial herbaceous plant belonging to the harebell family, has a useful effect on growth hormone secretion and growth promotion.

*Phlomis umbrosa* is used for arthritis, premature ejaculation, and anemia by strengthening muscles and bones, communicating blood vessels, and supporting the liver and kidney functions.

Young leaves and roots of *Phlomis umbrosa* according to the present disclosure may be used. Preferably, the roots are used.

The composition according to the present disclosure contains 30-45 parts by weight of *Astragalus membranceus*.

The major components of *Astragalus membranceus* according to the present disclosure include triterpenoids, isoflavonoids, and polysaccharides. The isoflavonoids contain formononetin and calycosin. The isoflavonoids are phytoestrogens, which are known to be a natural alternative to female sex hormones.

The leaves, shoots or roots of *Astragalus membranceus* according to the present disclosure can be used, preferably the roots.

The composition according to the present disclosure contains 5-10 parts by weight of *Amomi fructus*.

*Amomi fructus* according to the present disclosure refers to the fruit of a perennial herbaceous plant belonging to the ginger family. It contains 1.7 to 3% of aromatic essential oil as its effective medicinal component. The main components are d-camphor, d-boneol, bornyl acetate, linalol, and neroldal, and are effective for promotion of gastrointestinal motility, gastric ulcer, smooth muscle relaxation, pain relief, vomiting, diarrhea, dysentery, pregnancy vomiting, loss of appetite, indigestion, and dyspepsia related to muscle tension and food.

The composition according to the present disclosure contains 5-10 parts by weight of *Citri unshius pericarpium*.

*Citri unshius pericarpium* according to the present disclosure refers to tangerine peels that have been aged for one to three years and contains essential oil, citric acid, vitamin A, vitamin B1, D-calactosamine, vitamin C, hesperidin, beta-cryptoxanthin, and salpesterol, turpentine, etc. It is effective in improving liver function, improving chronic fatigue, enhancing physical strength, restoring energy, preventing cancer, preventing aging, preventing inflammation, reducing inflammation, treating bronchial diseases, preventing cardiovascular diseases, increasing immunity, and enhancing skin beauty. In particular, the beta-cryptoxanthin in *Citri unshius pericarpium* strengthens bones and is beneficial for osteoporosis.

The composition according to the present disclosure contains 1-5 parts by weight of *Drynariae rhizoma*.

The *Drynariae rhizoma* according to the present disclosure refers to the underground stem of *Davallia mariesii* and contains enzyme components such as alkaline photophosphatase and prolyl hydroxylase as its main components, which increase the thickness of bones and skin, relieve pain in the back and knees, and are beneficial for bone-related diseases such as osteoporosis, bone metabolic diseases, fusion of bone fractures, and growth promotion. *Drynariae rhizoma* also contains hesperidin, which has an antioxidant effect and is effective in discharging harmful free radicals, protecting capillaries, and preventing cardiovascular diseases such as hypertension, hyperlipidemia, and arteriosclerosis.

The composition according to the present disclosure contains 1-5 parts by weight of *Codonopsis pilosulae radix*.

*Codonopsis pilosulae radix* according to the present disclosure is the dried root of *Codonopsis pilosula*, a plant belonging to the bellflower family, and contains saponin, trace alkaloids, sucrose, glucose, inulin, starch, mucilage, resin, etc. The root contains essential oil, scutellarein glucoside, alkaloids, polysaccharides, inulin, saponin, etc. and is used to treat anorexia, dipsesis, hderocele, etc.

The composition according to the present invention contains 1-5 parts by weight of frankincense.

Frankincense according to the present disclosure is an aromatic medicinal product made by drying the sap of the frankincense tree of the olive family. The substance boswellic acid contained in frankincense increases the survival rate of chondrocytes and has an excellent protective effect on cartilage, inhibiting inflammation and improving blood circulation to reduce joint pain.

The composition according to the present disclosure comprises 1-5 parts by weight of myrrh.

The myrrh according to the present disclosure is a medicinal product made by drying the fluid flowing from the bark of the myrrh tree belonging to the myrrh family, and its medicinal components are 25 to 35% resin, 2.5 to 9% volatile essential oil, and 57 to 65% tree resin. The myrrh has a significant anti-inflammatory and analgesic effect, inhibits skin fungi, and inhibits the development of tuberculosis bacteria. In addition, it has excellent efficacy in relieving pain while improving blood circulation, and is thus widely used to treat joint swelling, congestion caused by bruises, and arthralgia.

The composition according to the present disclosure contains as active ingredients *Angelica gigas, Cnidium officinale, Phlomis umbrosa, Astragalus membranceus, Amomi fructus, Citri unshius pericarpium, Drynariae rhizoma, Codonopsis pilosulae radix*, frankincense, and myrrh, and may contain at least one auxiliary ingredient, such as, for example, *Atractylodes* rhizome, hawthorn, malt, *Paeonia japonica*, eucommiae cortex, corydaline, *Achyranthes, Acanthopanax*, quince, the Chinese matrimony vine, liquorice, dioscoreae rhizoma, *Cornus* fruit, and dried *Rehmannia glutinosa*.

The composition according to one embodiment of the present disclosure further contains 1-5 parts by weight of *Atractylodes* rhizome, 1-5 parts by weight of hawthorn, 1-5 parts by weight of malt, 1-5 parts by weight of *Paeonia japonica*, 5-7 parts by weight of eucommiae cortex, 1-5 parts by weight of corydaline, 5-7 parts by weight of *Achyranthes*, 5-7 parts by weight of *Acanthopanax*, 1-5 parts by weight of quince, 1-5 parts by weight, liquorice 1-5 parts by weight of the Chinese matrimony vine, 1-5 parts by weight of dioscoreae rhizoma, 1-5 parts by weight of *Cornus* fruit, and 1-5 parts by weight of dried *Rehmannia glutinosa*.

The composition according to the present disclosure contains 1-5 parts by weight of *Atractylodes* rhizome.

The *Atractylodes* rhizome according to one embodiment of the present disclosure is a dried *Atractylodes* root, which contains atractylol, atractylonen, and the like, and is excellent for improving appetite in chronic dyspepsia, enteritis, diarrhea, and the like due to its digestive action, and is often used for edema caused by nephritis due to its diuretic action. It also has the effect of lowering blood sugar and activating the function of the hepatic system.

The composition according to the present disclosure contains 1-5 parts by weight of hawthorn.

According to one embodiment of the present disclosure, hawthorn, which is the fruit of *Crataegus pinnatifida* for. *pinnatifida* belonging to the Rosaceae family, contains lipase and protease, which help digestion and promote fat breakdown. It also has the effect of lowering blood cholesterol, blood sugar, and fat levels, thereby preventing adult diseases such as heart disease, stroke, and diabetes, including hypertension and hyperlipidemia.

The composition according to the present disclosure contains 1-5 parts by weight of malt.

According to one embodiment of the present disclosure, malt is made by pouring water on barley, sprouting barley, drying the barley well, and lightly frying the barley. It contains starchy sugars and vitamins, and is effective in improving symptoms such as nasogastric weakness, indigestion, digestive disorders, and lack of milk secretion by strengthening gastrointestinal function, and is effective in preventing various cardiovascular diseases by promoting digestion and lowering blood sugar.

The composition according to the present disclosure contains 1-5 parts by weight of *Paeonia japonica*.

According to one embodiment of the present disclosure, *Paeonia japonica* refers to the root of the peony and contains a component called pioniflorin, which has the effect of relieving inflammation. Thus, *Paeonia japonica* is used to treat symptoms such as gastritis, stomach ulcers, and enteritis. It also has excellent analgesic properties and is useful for relieving uterine bleeding and pain in women because it strengthens the blood.

The composition according to the present disclosure contains 5-7 parts by weight of eucommiae cortex.

The eucommiae cortex according to one embodiment of the present disclosure, which is the dried bark of the

*Eucommia* tree, contains seven times more calcium than milk, and is very helpful in promoting bone health by strengthening bone density. It is also rich in alkaloids, which strengthen muscles and skeletons, and are useful for treating knee and back pain, nerve pain, and the like.

The composition according to the present disclosure contains 1-5 parts by weight of corydaline.

The corydaline according to one embodiment of the present disclosure, which is a perennial plant of the poppy corydaline family, is mainly used as a root and has an excellent analgesic effect, thus relieving postpartum dysmenorrhea, menstrual irregularities, abdominal pain, stomach pain, bruises, neuralgia, joint pain, and the like.

The composition according to the present disclosure contains 5-7 parts by weight of *Achyranthes*.

According to one embodiment of the present disclosure, the *Achyranthes* refers to the roots of the *Achyranthes bidentata*, and the leaves and stems of the *Achyranthes* are effective in treating arthritis. The saponins and calcium content of the *Achyranthes* are effective in expelling inflammation from the body, relieving pain, and reducing symptoms of rheumatoid arthritis and osteoarthritis of the knee.

The composition according to the present disclosure contains 5-7 parts by weight of *Acanthopanax*.

According to one embodiment of the present disclosure, the *Acanthopanax* belongs to Araliaceae. The root or stem thereof is mainly used, and contains acanthoside D, which has been shown to reduce the symptoms of arthritis by strengthening bones and tendons.

The composition according to the present disclosure contains 1-5 parts by weight of quince.

The quince according to one embodiment of the present disclosure, which is the fruit of the quince tree of the Rosaceae family, contains calcium, which is beneficial for strengthening bones and enhancing bone density.

The composition according to the present disclosure contains 1-5 parts by weight of the Chinese matrimony vine.

According to one embodiment of the present disclosure, the Chinese matrimony vine refers to the fruit of a deciduous shrub of the *Curcuma longa* family, contains betaine, which breaks down toxic substances accumulated in the liver and discharges them out of the body. It also contains rutin, which inhibits the production of cholesterol in the body, thereby improving blood circulation and strengthening blood vessel walls.

The composition according to the present disclosure contains 1-5 parts by weight of liquorice.

The liquorice according to one embodiment of the present disclosure is a perennial herb belonging to the dicotyledonous Rosaceae legume family and contains glycyrrhizin, which helps to expel harmful cholesterol from the blood vessels, and flavonoids, which have anticancer activity and help to inhibit the development and metastasis of cancer cells.

The composition according to the present disclosure contains 1-5 weight parts of dioscoreae rhizoma.

The dioscoreae rhizoma according to one embodiment of the present disclosure refers to the tuberous root of yam or cinnamon vine, which contains mucin, a sticky mucilage, which protects the gastric mucosa and has an excellent effect on improving digestive function. In addition, it contains diastase, saponins, vitamins C and E, and arginine, and thus promotes the secretion of insulin to relieve diabetic symptoms, lowers cholesterol levels to improve blood circulation, and provides antioxidant effects.

The composition according to the present disclosure contains 1-5 parts by weight of *Cornus* fruit.

The *Cornus* fruit according to one embodiment of the present disclosure, which is the flower of the *Cornus officinalis* of the Umbellales Dogwood family, contains cornin, a compound that acts similarly to the female hormone estrogen, to help reduce symptoms of menopause, such as osteoporosis, which is often caused by a decline in female hormones.

The composition according to the present disclosure contains 1-5 parts by weight of dried *Rehmannia glutinosa*.

The dried *Rehmannia glutinosa* according to one embodiment of the present disclosure, which is the dried rhizome of the plant *Rehmannia glutinosa*, a member of the *Ginseng* family, contains catalpol and stachyose as its main ingredients and is used for diuresis, blood sugar control, uterine bleeding, menstrual disorders, constipation, and weakness.

According to one embodiment of the present disclosure, the method for manufacturing a composition promoting bone density enhancement includes preparing a mixture of *Angelica gigas, Cnidium officinale, Phlomis umbrosa, Astragalus membranceus, Amomi fructus, Citri unshius pericarpium*, drynariae rhizoma, *Codonopsis pilosulae radix*, frankincense and myrrh, and aging the mixture.

According to one embodiment of the present disclosure, the aging of the mixture includes adding 5-10 parts by weight of oat milk and 1-5 parts by weight of flaxseed oil to the mixture and aging the mixture at a temperature of 40° C. for 5 hours.

The flaxseed oil according to the present disclosure is rich in lignans, which have a structure similar to the female hormone estrogen. In addition to the role of estrogen, lignans help to alleviate menopausal symptoms in postmenopausal women, such as osteoporosis and decreased bone production, by decreasing the production of androgen and increasing the synthesis of estrogen.

When hormonal changes occur in the body (estrogen deficiency, hyperparathyroidism, etc.), which causes low bone density, the balance between RANKL and its in vivo antagonist, osteoprotegerin (OPG), is disrupted, resulting in increased osteoclast activity, and the activated osteoclasts produce cathepsin K, a type of bone proteolytic agents, calcitonin receptor (Cal-R), and tartrate resistant acid phosphate (TRAP). To prevent bone disease, these bone proteolytic agents must be inhibited to reduce bone resorption.

Bone resorption inhibitors include calcium, vitamin D, calcitonin, female sex hormones, tibolone, selective estrogen receptor modulators, and bisphosphonates, among which lignans, which function similarly to the female sex hormone estrogen, may prevent loss of bone density.

The lignans contained in the flaxseed according to the present disclosure are vegetable compounds with a diphenolic structure contained in plants, and exist in nature in the form of secoisolariciresinol, mataireinol, pinoresinol, medioresinol, lariciresinol, syringaresinol, sesamin, or the like, which are converted into the animal lignans enterodiol and enterolactone by the intestinal microflora and absorbed in the body.

Plant lignans contained in plants such as flaxseed are metabolized by the gut microbiota after ingestion by mammals into animal lignans that can be contained in mammalian products such as dairy products.

Co-consumption of plant lignans with mammalian products, such as dairy products, allows for direct ingestion of the animal lignan form and increases the activity ratio of the plant lignans, thereby increasing the absorption rate of the lignans ingested by the user.

The oat milk according to the present disclosure has the effect of reducing the bitterness and increasing the flavor of the composition, providing animal lignans, and increasing the activity ratio of the plant lignans contained in the flaxseed.

A method for manufacturing a composition promoting bone density enhancement according to one embodiment of the present disclosure includes drying the mixture and grinding the same into a powder.

The mixture according to the present disclosure is dried at 90° C. and ground into a powder with a particle size of 0.1-0.5 cm.

The method for manufacturing a composition promoting bone density enhancement according to one embodiment of the present disclosure includes extracting a liquid from the powder.

According to one embodiment of the present disclosure, the extracting of the liquid from the powder includes adding 5-10 parts by weight of ethanol to the powder as a solvent, and repeatedly extracting the liquid 6 times at a temperature of 60° C. for 2 hours by applying 20-30 kHz ultrasonic waves.

The ultrasonic extraction according to the present disclosure generates very large energy by cavitation caused by ultrasonic vibration. In addition, due to the local temperature, sufficient energy is obtained to increase the kinetic energy of the reactant particles located in the vicinity, and high pressure is induced by the impact effect of the ultrasonic energy to enhance the mixing and extraction effect (Chung et al., 2000).

The ultrasonic extraction process may shorten the extraction time, improve the extraction yield, and ensure the safe elution of useful components. The high pressure caused by the cavitation generated by the ultrasonic energy may not only shorten the travel distance of the fatty substance by destroying the cellular tissue, but also facilitate diffusion by the stirring effect caused by the creation and destruction of cavities, resulting in a high extraction amount in a shorter time than in conventional extraction methods.

The ultrasonic extraction according to the present disclosure is performed by adding 5-10 parts by weight of ethanol as a solvent to the powder using an ultrasonic homogenizer (KUS-650, KBT, Seongnam, Korea) and generating 20-30 KHz ultrasonic waves at a temperature of 60° C. for a total of 2 hours, by repeating the process of 10 minutes of extraction and 10 minutes of rest 6 times.

The ultrasonic extraction according to the present disclosure is performed by a system capable of ensuring human safety and performing selective extraction, and provides the effect of uniform and efficient extraction of the active ingredients of the composition. The unique ingredients are nutritionally stable and can be preserved for a long time.

The present invention will be described in more detail below with reference to embodiments of the present disclosure. However, it should be noted that these embodiments are intended to illustrate the present invention, and the present invention is not limited by these embodiments.

Embodiment 1

To manufacture the composition promoting bone density enhancement according to the present disclosure, 7 parts by weight of *Angelica gigas,* 7 parts by weight of *Cnidium officinale,* 5 parts by weight of *Phlomis umbrosa,* 30 parts by weight of *Astragalus membranceus,* 5 parts by weight of *Amomi fructus,* 7 parts by weight of *Citri unshius pericarpium,* 3 parts by weight of *Drynariae rhizoma,* 2 parts by weight of *Codonopsis pilosulae radix,* 3 parts by weight of frankincense and 3 parts by weight of myrrh are mixed, and additionally 3 parts by weight of *Atractylodes* rhizome, 3 parts by weight of hawthorn, 3 parts by weight of malt, 3 parts by weight of *Paeonia japonica,* 6 parts by weight of eucommiae cortex, 3 parts by weight of corydaline, 6 parts by weight of *Achyranthes,* 6 parts by weight of *Acanthopanax,* 3 parts by weight of quince, 3 parts by weight of the Chinese matrimony vine, and 3 parts by weight of liquorice, 3 parts dioscoreae rhizoma, 3 parts by weight of *Cornus* fruit, and 3 parts by weight of dried *Rehmannia glutinosa* are further mixed. The mixture is mixed with 7 parts by weight of oat milk and 3 parts by weight of flaxseed oil, and aged for 5 hours at a temperature of 40° C. Using an ultrasonic homogenizer (KUS-650, KBT, Seongnam, Korea), 7 parts by weight of ethanol was added to the powder as a solvent, and 25 kHz ultrasonic waves were generated to extract the composition promoting bone density enhancement at a temperature of 60° C. for 2 hours with a total of 6 repetitions of 10 minutes of extraction and 10 minutes of rest, to obtain a product.

Comparative Example 1

A nutritional supplement that promotes bone density enhancement using commercially available oriental herbal medicines was used.

Comparative Example 2

The composition was manufactured in the same manner as in Embodiment 1, except that instead of aging the mixture at a temperature of 40° C. for 5 hours with 7 parts by weight of oat milk and 3 parts by weight of flaxseed oil added, the mixture was not aged, but was immediately dried and ground into a powder.

Comparative Example 3

The composition was manufactured in the same manner as in Embodiment 1, except that instead of aging the mixture at a temperature of 40° C. for 5 hours with 7 parts by weight of oat milk and 3 parts by weight of flaxseed oil added, the mixture was aged at 40° C. for 5 hours with 1 part by weight of oat milk and 3 parts by weight of flaxseed oil added.

Comparative Example 4

The composition was manufactured in the same manner as in Embodiment 1, except that instead of aging the mixture at a temperature of 40° C. for 5 hours with 7 parts by weight of oat milk and 3 parts by weight of flaxseed oil added, the mixture was aged at 40° C. for 5 hours with 20 parts by weight of oat milk and 3 parts by weight of flaxseed oil added.

Comparative Example 5

The composition was manufactured in the same manner as in Embodiment 1, except that instead of aging the mixture at a temperature of 40° C. for 5 hours with 7 parts by weight of oat milk and 3 parts by weight of flaxseed oil added, the mixture was aged at 40° C. for 5 hours with 7 parts by weight of oat milk and 0.1 part by weight of flaxseed oil added.

Comparative Example 6

The composition was manufactured in the same manner as in Embodiment 1, except that instead of aging the mixture at a temperature of 40° C. for 5 hours with 7 parts by weight of oat milk and 3 parts by weight of flaxseed oil added, the mixture was aged at 40° C. for 5 hours with 7 parts by weight of oat milk and 20 parts by weight of flaxseed oil added.

Experimental Example 1: Bone Density Change Test

For Embodiment 1 and Comparative examples 1 to 6, bone density changes were measured for the compositions promoting bone density enhancement.

Animal experiments were conducted to determine changes in bone density for the compositions promoting bone density enhancement for Embodiment 1 and Comparative examples 1 to 6.

Seven male and seven female mice of the same body weight were prepared for the experiment, and 0.5 mg of the composition per 10 g of mouse body weight was administered orally to each mouse for 4 weeks, and the bone density of the right tibia of the mice was measured by micro-CT [manufactured by RIKU]. The results are shown in Table 1 below.

TABLE 1

Results of Bone Density Measurement

| | Bone density(mg/cm$^2$) | |
| --- | --- | --- |
| | Male | Female |
| Embodiment 1 | +3.0 | +3.5 |
| Comparative example 1 | +1.0 | +1.2 |
| Comparative example 2 | +1.5 | +1.8 |
| Comparative example 3 | +1.9 | +2.2 |
| Comparative example 4 | +2.2 | +2.5 |
| Comparative example 5 | +2.1 | +2.4 |
| Comparative example 6 | +2.4 | +2.6 |

Based on the results in Table 1 above, it can be seen that the composition promoting bone density enhancement of Embodiment 1 provides a higher increase in bone density enhancement than the products of Comparative examples 1 to 6.

More specifically, in the case of Embodiment 1, it was confirmed that bone density enhancement was promoted more than in Comparative examples 1 and 6 when the mixture was prepared by adding 7 parts by weight of oat milk and 3 parts by weight of flaxseed oil and aging the mixture at a temperature of 40° C. for 5 hours. When the composition was manufactured by adding 7 parts by weight of oat milk and 3 parts by weight of flaxseed oil to the mixture and aging the mixture, it was confirmed that the composition was effective in promoting bone density enhancement because the lignans contained in the composition complemented female hormones to prevent hormone-induced decrease in bone density and increased the absorption rate of lignans.

Experimental Example 2: Bone Regeneration Induction Test

To induce bone regeneration for the compositions promoting bone density enhancement for Embodiment 1 and Comparative examples 1 to 6, when mice with skull defects were treated with the compositions, the extent of bone formation was analyzed by micro-CT [manufactured by RIKAKU]. The results are shown in Table 2 below.

TABLE 2

Results of Bone Regeneration Induction Measurement

| | Extent of bone formation |
| --- | --- |
| Embodiment 1 | ++++++ |
| Comparative example 1 | + |
| Comparative example 2 | +++ |
| Comparative example 3 | +++ |
| Comparative example 4 | ++++ |
| Comparative example 5 | ++++ |
| Comparative example 6 | ++++ |

Based on the results in Table 2 above, it can be seen that the composition promoting bone density enhancement of Embodiment 1 provides higher induction of bone regeneration than the products of Comparative examples 1 to 6.

More specifically, in the case of Embodiment 1, it was confirmed that the induction of bone regeneration was higher than in Comparative examples 1 and 6 when the mixture was prepared by adding 7 parts by weight of oat milk and 3 parts by weight of flaxseed oil and aging the mixture at a temperature of 40° C. for 5 hours. In particular, it was confirmed that the active ingredients of the composition were activated and effective in inducing bone regeneration when the composition was manufactured by adding 7 parts by weight of oat milk and 3 parts by weight of flaxseed oil to the mixture and aging the mixture.

Experimental Example 3: Sensory Test

Sensory tests regarding flavor, aroma, and overall palatability of the composition promoting bone density enhancement were conducted for Embodiment 1 and Comparative examples 1 to 6. The sensory test was performed by 30 sensory testers (15 men and 15 women) with experience in sensory testing, using a 9-point scale. The results are shown in Table 3 below.

TABLE 3

Results of Sensory Test

| | Flavor | Aroma | Overall palatability |
| --- | --- | --- | --- |
| Embodiment 1 | 8.3 | 8.1 | 8.4 |
| Comparative example 1 | 5.0 | 5.0 | 5.0 |
| Comparative example 2 | 6.1 | 6.3 | 6.5 |
| Comparative example 3 | 6.3 | 6.2 | 6.4 |
| Comparative example 4 | 6.9 | 7.1 | 7.0 |
| Comparative example 5 | 6.8 | 7.4 | 7.1 |
| Comparative example 6 | 6.7 | 7.2 | 7.0 |

Based on the results in Table 3 above, it can be seen that the composition promoting bone density enhancement of Embodiment 1 provides a higher score in the sensory test than the products of Comparative examples 1 to 6.

More specifically, for Embodiment 1, it was confirmed that aging the mixture with 7 parts by weight of oat milk and 3 parts by weight of flaxseed oil added provided a higher flavor and aroma than in Comparative examples 1 and 6. It was also confirmed that adding 7 parts by weight of oat milk to the mixture and aging mixture reduced bitterness and increased sweetness, and thus was effective in increasing the utilization of the composition.

The method for manufacturing a composition promoting bone density enhancement according to one embodiment of the present disclosure may provide a composition that effectively promotes bone density enhancement while reducing bitterness, increasing sweetness, and complementing and activating female sex hormones to promote bone density enhancement when compared to a conventional method for manufacturing a composition promoting bone density enhancement.

As is apparent from the above description, the present disclosure provides the following effects.

A method for manufacturing a composition promoting bone density enhancement according to the present disclosure may provide a composition capable of increasing the bone density.

A method for manufacturing a composition promoting bone density enhancement according to the present disclosure may provide a composition capable of complementing female sex hormones.

A method for manufacturing a composition promoting bone density enhancement according to the present disclosure may provide a composition capable of increasing the absorption rate of a female sex hormone.

A method for manufacturing a composition promoting bone density enhancement according to the present disclosure may provide a composition that can be used as a main ingredient or added as a minor ingredient in the fields of medicine, cooking, nutritional products, and the like.

The effects of the present disclosure are not limited to those mentioned above, and other effects not mentioned will be apparent to those skilled in the art from the claims.

The foregoing description of the disclosure is provided to enable those skilled in the art to practice or use the disclosure. Various modifications of the disclosure will be readily apparent to those skilled in the art, and the general principles defined herein may be applied to various modifications without departing from the spirit or scope of the disclosure. Accordingly, the disclosure is not intended to be limited to the examples described herein, but is intended to be given the broadest possible scope consistent with the principles and novel features disclosed herein.

While the present disclosure has been described in relation to some embodiments, it should be appreciated that various modifications and changes can be made without departing from the scope of the present disclosure as would be understood by one of ordinary skill in the art to which the present disclosure pertains. Further, such modifications and changes are to be considered as falling within the scope of the claims appended hereto.

What is claimed is:

1. A method for manufacturing a composition promoting bone density enhancement, the method comprising:
   preparing a mixture by mixing 5-10 parts by weight of *Angelica gigas,* 5-10 parts by weight of *Cnidium officinale,* 5-7 parts by weight of *Phlomis umbrosa,* 30-45 parts by weight of *Astragalus membranceus,* 5-10 parts by weight of *Amomi fructus,* 5-10 parts by weight of *Citri unshius pericarpium,* 1-5 parts by weight of *Drynariae rhizoma,* 1-5 parts by weight of *Codonopsis pilosulae radix,* 1-5 parts by weight of frankincense, 1-5 parts by weight of myrrh, 1-5 parts by weight of *Atractylodes* rhizome, 1-5 parts by weight of hawthorn, 1-5 parts by weight of malt, 1-5 parts by weight of *Paeonia japonica,* 5-7 parts by weight of eucommiae cortex, 1-5 parts by weight of corydaline, 5-7 parts by weight of *Achyranthes,* 5-7 parts by weight of *Acanthopanax,* 1-5 parts by weight of quince, 1-5 parts by weight, liquorice 1-5 parts by weight of Chinese matrimony vine, 1-5 parts by weight of dioscoreae rhizoma, 1-5 parts by weight of *Cornus* fruit, and 1-5 parts by weight of dried *Rehmannia glutinosa;*
   aging the mixture;
   drying the mixture and grinding the mixture into a powder; and
   extracting a liquid from the powder,
   wherein the aging of the mixture comprises:
   adding 5-10 parts by weight of oat milk and 1-5 parts by weight of flaxseed oil to the mixture; and
   aging the mixture at a temperature of 40° C. for 5 hours,
   wherein the extracting of the liquid from the powder comprises:
   adding 5-10 parts by weight of ethanol to the powder as a solvent; and
   repeatedly extracting the liquid 6 times at a temperature of 60° C. for 2 hours by applying 20-30 kHz ultrasonic waves.

2. The method of claim 1, wherein the aging of the mixture comprises:
   adding 7 parts by weight of the oat milk and 3 parts by weight of the flaxseed oil to the mixture; and
   aging the mixture at the temperature of 40° C. for 5 hours.

3. The method of claim 1, wherein the extracting of the liquid from the powder comprises:
   adding 7 parts by weight of the ethanol to the powder as the solvent; and
   repeatedly extracting the liquid 6 times at a temperature of 60° C. for 2 hours by applying 25 kHz ultrasonic waves.

* * * * *